United States Patent [19]

Hashimoto et al.

[11] Patent Number: 4,590,127
[45] Date of Patent: May 20, 1986

[54] ABRASIVE USED IN MAGNETIC RECORDING MEDIUM AND PRODUCTION THEREOF

[75] Inventors: Tadanori Hashimoto, Takatsuki; Kazuhiko Nakano, Katano; Norio Matsuda, Ibaraki, all of Japan

[73] Assignee: Sumitomo Chemical Company, Limited, Osaka, Japan

[21] Appl. No.: 693,226

[22] Filed: Jan. 22, 1985

Related U.S. Application Data

[63] Continuation of Ser. No. 545,278, Oct. 25, 1983, abandoned.

[30] Foreign Application Priority Data

Nov. 2, 1982 [JP] Japan ............................ 57-192843

[51] Int. Cl.$^4$ ............................................. H01F 10/02
[52] U.S. Cl. ........................... 428/405; 427/128; 427/215; 428/403; 428/404; 428/695; 428/697; 428/900
[58] Field of Search .................. 427/127–132, 427/48, 215; 428/900, 405, 695, 403, 697, 404; 252/62.54

[56] References Cited

U.S. PATENT DOCUMENTS

| | | | |
|---|---|---|---|
| 3,007,807 | 11/1961 | Radocy | 428/900 |
| 3,630,910 | 12/1971 | Akashi et al. | 252/62 |
| 3,790,407 | 2/1974 | Merten et al. | 117/240 |
| 3,833,412 | 9/1974 | Akashi et al. | 117/240 |
| 3,992,558 | 11/1976 | Smith-Johanssen | 428/404 |
| 4,153,754 | 5/1979 | Huisman | 428/404 |
| 4,191,587 | 3/1980 | Kratel | 428/405 |
| 4,275,115 | 6/1981 | Haruse | 428/900 |
| 4,320,159 | 3/1982 | Ogawa | 428/694 |
| 4,330,600 | 5/1982 | Kawasumi et al. | 428/694 |
| 4,334,887 | 6/1982 | Frank | 428/694 |
| 4,379,809 | 4/1983 | Matsufuji et al. | 428/470 |

FOREIGN PATENT DOCUMENTS

| | | |
|---|---|---|
| 51-81110 | 7/1976 | Japan . |
| 55-17816 | 4/1980 | Japan . |
| 1145349 | 3/1969 | United Kingdom . |

*Primary Examiner*—Bernard D. Pianalto
*Attorney, Agent, or Firm*—Stevens, Davis, Miller & Mosher

[57] ABSTRACT

When an abrasive having an oleophilic surface intended for use in magnetic recording media, said abrasive being obtained by subjecting an inorganic powder material having a Mohs hardness of 5 or above and an average particle size of 2 $\mu$m or below to a wet contact treatment with an aqueous solution or an organic solvent solution containing a dispersing agent having an oleophilic group and drying the treated powder material, is used together with a magnetic powder material in the magnetic recording layer of a magnetic recording medium, the wear of the magnetic head can be prevented and the still characteristics of the recording medium is improved.

6 Claims, No Drawings

ABRASIVE USED IN MAGNETIC RECORDING MEDIUM AND PRODUCTION THEREOF

This application is a continuation of application Ser. No. 545,278 filed Oct. 25, 1983, now abandoned.

BACKGROUND OF THE INVENTION

This invention relates to an abrasive incorporated in magnetic recording media such as magnetic tape, magnetic disc, and the like, and to a magnetic recording medium comprising an abrasive (note: said abrasive is sometimes called a reinforcing agent, because it acts as an abrasive upon a magnetic head, while it serves as reinforcing agent for a magnetic tape or the like). More particularly, this invention relates to an abrasive for use in a magnetic recording medium such as magnetic tape, magnetic sheet, magnetic disc or the like to give excellent wear resistance to the magnetic recording medium without losing surface smoothness of the magnetic layer thereof and to give moderate abrasion to a magnetic head to renew the head as well, and relates also to a magnetic recording medium comprising such an abrasive.

A magnetic recording medium such as magnetic tape, magnetic sheet, or magnetic disc used in audio or video equipments or in computers comes in sliding contact at a high relative speed with a magnetic head at the time of recording and reproducing and, as a result, tends to become worn away. Conventional magnetic layers are unsatisfactory in this respect and, hence, a magnetic layer less susceptible to abrasion and of improved durability is demanded. Particularly in the case of a magnetic video recording medium, it is required to improve the so-called still picture reproducing characteristics (still characteristics), wherein recorded signals are reproduced by repeatedly scanning the same part of a magnetic coating with a revolving magnetic head.

To improve the above disadvantages, it has heretofore been proposed to incorporate as a reinforcing agent a nonmagnetic powder material such as chromia ($Cr_2O_3$), alumina ($Al_2O_3$), or silicon carbide (SiC) into the magnetic layer. It is not easy, however, to disperse uniformly the above reinforcing agents in the magnetic layer, and there occurs frequently non-uniformity of the dispersion, resulting in a decrease in wear resistance of the magnetic layer, an excessive wearing of the magnetic head, or a decrease in smoothness of the tape surface. To overcome such disadvantages, there is known a method in which the coating composition to be used in forming the magnetic layer is admixed with a dispersing agent such as n-butyl stearate, liquid paraffin, or sodium alkylbenzenesulfonate in its manufacturing stage and thoroughly mixed in wet state to improve the dispersibility of reinforcing agents. This method, however, is not effective for improving sufficiently the dispersibility.

The present inventors carried out an extensive study to overcome the above difficulties and, as a result, found that it became possible to improve the dispersibility more effectively, as compared with the known methods, by imparting the dispersibility to a reinforcing agent by a specific method and that by using such a reinforcing agent it became possible to improve the wear resistance of both the magnetic layer and the magnetic head and to improve also the smoothness of the tape surface. This invention has been accomplished based on the above finding.

SUMMARY OF THE INVENTION

One object of this invention is to provide an abrasive for magnetic recording medium and exhibiting an excellent dispersibility in the production of a magnetic recording medium.

Another object of this invention is to provide an abrasive having an oleophilic surface for magnetic recording medium to achieve the above object and to provide a process for producing such an abrasive.

A further object of this invention is to provide a magnetic recording medium comprising a support and a magnetic layer coated thereon containing an excellently dispersible abrasive therein.

Still further objects and advantages of this invention will become apparent to those skilled in the art from the following description.

This invention provides a process for producing an abrasive having an oleophilic surface for use in magnetic recording media, which comprises subjecting an inorganic powder material having an average particle size of 2 $\mu$m across or below and a Mohs hardness of 5 or above to a wet contact treatment by stirring said powder material in an aqueous solution or an organic solvent solution of a dispersing agent having an oleophilic group, followed by drying, and the abrasive thus produced.

This invention also provides a magnetic recording medium comprising a support and a magnetic recording layer coated thereon, characterized in that said magnetic recording layer contains a magnetic powder and an abrasive having an oleophilic surface produced by the abovementioned process.

DESCRIPTION OF THE PREFERRED EMBODIMENTS

The inorganic powder materials used in this invention are those having a Mohs hardness of 5 or above and, more particularly, are selected from metal oxides and double oxides such as $\gamma$-alumina, $\alpha$-alumina, silica, iron oxide, chromium oxide, titanium oxide, zirconium oxide, cerium oxide, tin (stannous or stannic) oxide, silicon carbide, spinel, zinc aluminate, and aluminosilicate. Suitable shapes of the powder materials are granular, preferably spherical, with a particle size of 2 $\mu$m across or below, preferably 0.1 to 1 $\mu$m, in average (median particle size), and of a narrow particle size distribution. When an inorganic powder material having an average particle size larger than 2 $\mu$m is used, there arise many porblems in that the abrasive action on the magnetic head becomes so large that the head tends to be worn down and even get scratches, there takes place drop-out at the time of recording and reproducing. When the average particle size is too small, the powder material does not meet the primary requirement of improving the wear resistance of the magnetic recording medium. An inorganic powder material having a Mohs hardness below 5 is not desirable, because both the reinforcing effect upon a magnetic recording medium and the improvement in wear resistance are no longer expectable. Of the above-listed inorganic powder materials, especially preferred are $\gamma$-alumina, $\alpha$-alumina, chromium oxide, and titanium oxide.

Dispersing agents having oleophilic groups usable in this invention are higher fatty acids having 10 to 18 carbon atoms (hereinafter the number of carbon atoms is referred to as "$C_{10-18}$") such as decanioc acid, dodecanoic acid, tetradecanoic acid, hexadecanoic acid, octadecanoic acid, and oleic acid, and salts thereof (the term "salt" as used herein means ammonium, sodium, potassium, magnesium, calcium, or aluminum salt and the term "salt" is used hereinafter in the same meaning); salts of sulfuric acid esters of higher ($C_{10-18}$) alcohols such as decyl sulfate salts, dodecyl sulfate salts, tetradecyl sulfate salts, hexadecyl sulfate salts, and octadecyl sulfate salts; salts of ($C_{10-18}$)alkyl-($C_6$ or $C_{10}$)arylsulfonic acids such as decylbenzenesulfonic acid salts, dodecylbenzenesulfonic acid salts, tetradecylbenzenesulfonic acid salts, hexadecylbenzenesulfonic acid salts, and octadecylbenzenesulfonic acid salts; salts of di($C_{4-12}$)alkyl sulfosuccinic acid such as di-(2-ethylhexyl) sulfosuccinate salts; polyoxyethylene (attaching 7–13 moles of ethylene oxide, hereinafter refered to as "7–13 moles" for brevity) ($C_{10-18}$)alkyl ether sulfate salts such as polyoxyethylene decyl ether sulfate salts, polyoxyethylene dodecyl ether sulfate salts, polyoxyethylene tetradecyl ether sulfate salts, polyoxyethylene hexadecyl ether sulfate salts, and polyoxyethylene octadecyl ether sulfate salts; poly(7–13 moles)oxyethylene higher ($C_{10-18}$)alcohol ethers such as polyoxyethylene decyl ethers, polyoxyethylene dodecyl ethers, polyoxyethylene tetradecyl ethers, polyoxyethylene hexadecyl ethers, polyoxyethylene octadecyl ethers, and polyoxyethylene oleyl ethers; poly(7–13 moles)oxyethylene($C_{8-18}$)alkylphenol ethers such as polyoxyethylene octylphenol ethers, polyoxyethylene nonylphenol ethers, polyoxyethylene decylphenol ethers, polyoxyethylene dodecylphenol ethers, polyoxyethylene tetradecylphenol ethers, polyoxyethylene hexadecylphenol ethers, and polyoxyethylene octadecylphenol ethers; sorbitan esters of higher ($C_{10-18}$) fatty acids such as sorbitan decanoate, sorbitan dodecanoate, sorbitan tetradecanoate, sorbitan hexadecanoate, sorbitan octadecanoate, and sorbitan oleate; poly(7–13 moles)oxyethylene sorbitan higher ($C_{10-18}$) fatty acid esters such as polyoxyethylene sorbitan decanoate, polyoxyethylene sorbitan dodecanoate, polyoxyethylene sorbitan tetradecanoate, polyoxyethylene sorbitan hexadecanoate, polyoxyethylene sorbitan octadecanoate, and polyoxyethylene sorbitan oleate; poly(7–13 moles)oxyethylene higher ($C_{10-18}$) fatty acid esters such as polyoxyethylene decanoate, polyoxyethylene dodecanoate, polyoxyethylene tetradecanoate, polyoxyethylene hexadecanoate, polyoxyethylene octadecanoate, and polyoxyethylene oleate; higher ($C_{10-18}$) fatty acid glycerol esters such as glycerol dodecanoate, glycerol octadecanoate, and glycerol oleate; higher ($C_{10-18}$)alkylamine acetates such as decylamine acetate, dodecylamine acetate, tetradecylamine acetate, hexadecylamine acetate, and octadecylamine acetate; quaternary ($C_{1-18}$)alkylammonium salts such as decyltrimethylammonium chloride, dodecyltrimethylammonium chloride, tetradecyltrimethylammonium chloride, hexadecyltrimethylammonium chloride, octadecyltrimethylammonium chloride, didodecyldimethylammonium chloride, and dioctadecyldimethylammonium chloride; poly(7–13 moles)oxyethylene ($C_{10-18}$)alkylamines such as polyoxyethylene decylamine, polyoxyethylene dodecylamine, polyoxyethylene tetradecylamine, polyoxyethylene hexadecylamine, and polyoxyethylene octadecylamine; phospholipids such as lecithin; organosilicon compounds known as silane coupling agents such as vinyltrichlorosilane, vinyltriethoxysilane, vinyltris($\beta$-methoxyethoxy)silane, $\gamma$-glycidoxypropyltrimethoxysilane, $\gamma$-methacoryloxypropyltrimethoxysilane, N-$\beta$-(aminoethyl)-$\gamma$-aminopropyltrimethoxysilane, N-$\beta$-(aminoethyl)-$\gamma$-aminopropylmethyldimethoxysilane, $\gamma$-chloropropyltrimethoxysilane, $\gamma$-mercaptopropyltrimethoxysilane, $\gamma$-aminopropyltrimethoxysilane, $\gamma$-aminopropyltriethoxysilane, $\beta$-(3,4-epoxycyclohexyl)ethyltrimethoxysilane, $\gamma$-glycidoxypropyltrimethoxysilane, and $\gamma$-mercaptopropyltrimethoxysilane; and organotitanium compounds known as titanium coupling agents such as isopropyltriisostearoyl titanate, isopropyltridodecylbenzenesulfonyl titanate, isopropyltris(dioctyl pyrophosphate) titanate, tetraisopropylbis(dioctyl phosphite) titanate, tetraoctylbis(ditridecyl phosphite) titanate, tetra(2,2-diallyloxymethyl-1-butyl)-bis(ditridecyl)phosphite titanate, bis(dioctyl pyrophosphate)oxyacetate titanate, and tris(dioctyl pyrophosphate)ethylene titanate. These compounds can be used alone or as a mixture thereof.

According to this invention, it can be performed to make an inorganic powder olephilic on its surface by the wet contact treatment in which the inorganic powder material is stirred in an aqueous solution or a solution of organic solvent containing a dispersing agent having an oleophilic group. After the treatment, the powder material is dried. Before making the powder material oleophilic, the agglomerated particles are converted to primary particles by either of the following known methods: (1) a method utilizing the surface charge of inorganic powder materials (hereinafter referred to as the charging method; the dispersing agent is used in the form of an aqueous solution), and (2) a solvent method in which an organic solvent is used. The choice of the method more suitable for the dispersion may be made according to the type and conditions of the inorganic powder material to be treated. The procedure of disagglomeration into primary particles and the succeeding treatment for making oleophilic are described below in detail.

The charging method can be carried out either by taking advantage of the isoelectric point of the inorganic powder material or by utilizing the preferential adsorption of an ion to the inorganic powder material. In the former case, secondary particles are disagglomerated to primary particles to promote the dispersion by the repulsion between the charged particles, because the surface charge of an inorganic powder material in water varies with pH, generally being positively charged in acid side where pH is smaller than the isoelectric point, while being negatively charged in alkaline side where pH is larger than the isoelectric point; in the latter case, preferential adsorption of a specific ion to the solid surface is taken to advantage.

For instance, titanium dioxide ($TiO_2$) or $\alpha$-ferric oxide ($\alpha$-$Fe_2O_3$) disperses easily in an aqueous aluminum chloride solution, because pH (about 3) of the aqueous aluminum chloride solution is smaller (i.e. in the acid side) than the isoelectric point (4.7) of $TiO_2$ or that (5.2) of $\alpha$-$Fe_2O_3$ and, hence, particles of $TiO_2$ or $\alpha$-$Fe_2O_3$ acquire a positive charge. Another reason seems to be selective adsorption of $Al^{+++}$ on the surface of $TiO_2$ or $\alpha$-$Fe_2O_3$ particles. To the resulting slurry, is added an anionic surface active agent, preferably one capable of forming an insoluble salt with the $Al^{+++}$ ion on the surface of dispersed particles, for example, sodium alkylbenzenesulfonate, sodium dodecanoate, or the like. The surface active agent is adsorbed in oriented arrangement to the surface to make the inorganic powder material oleophilic on the surface.

In the case of treating the inorganic powder material by the solvent method, the powder material is dispersed in a solvent having a suitable solubility parameter for the powder material, then a soluble fatty acid or the like is added to dissolve in the solvent, and a nonsolvent is added to deposit the fatty acid or the like, whereby the surface of the powder material adsorbs the fatty acid or the like and becomes oleophilic. As an example, $TiO_2$ is made oleophilic by dispersing it in isopropyl alcohol (IPA), then adding a higher fatty acid such as dodecanoic acid to the suspension to form a solution in the solvent, and adding water to precipitate the higher fatty acid to adsorb on the surfaces of $TiO_2$ particles.

The dispersing agent having an oleophilic group can be used in an amount of 0.01 to 20 parts by weight, preferably 0.02 to 10 parts by weight, more preferably 0.5 to 2 parts by weight per 100 parts by weight of the inorganic powder material. When the amount of the dispersing agent is less than 0.01 part by weight, the effect for improving the dispersibility becomes slight. On the other hand, when the amount is over 20 parts by weight, the effect of improving the dispersibility does not increase anymore, and further it is not advantageous from the economical viewpoint to use such a large amount of dispersing agent and at the same time undesirably shows a tendency to bring about a blooming phenomenon due to an excess amount of the dispersing agent in the magnetic recording medium.

Advantages of the abrasives of the present invention for use in magnetic recording media are sufficiently realized when the inorganic powder material having an oleophilic surface is added in an amount of 0.1 to 15, preferably 0.5 to 10, parts by weight per 100 parts by weight of the magnetic powder material. When the amount is below 0.1 part by weight, the wear resistance of the magnetic layer in magnetic recording media becomes inferior, while when it exceeds 15 parts by weight, the abrasion of the magnetic head undesirably increases.

The magnetic material used in this invention may be selected arbitrarily from conventional magnetic materials such as $\gamma$-$Fe_2O_3$, triiron tetraoxide ($Fe_3O_4$), cobalt-containing $\gamma$-$Fe_2O_3$, reduced iron powder, and chromium (IV) oxide ($CrO_2$). The particle size generally used is in the range of from 0.1 to 5 $\mu$m, though not limitative.

As binders, there can be used thermoplastic resins, thermosetting resins, or mixtures thereof. Examples of the binder used in this invention are epoxy resins, polyurethane resins, urea resins, polyamide resins, silicone resins, polyester resins, phenol resins, urea-formaldehyde resins, vinyl resins, cellulose derivatives, homopolymers and copolymers of acrylic acid or methacrylic acid, and alkyd resins. These resins can be used alone or in combination thereof.

Advantages of the inorganic powder material having oleophilic surface according to this invention, when used as an abrasive in magnetic recording media, are described below with reference to Examples, in which all parts are by weight.

EXAMPLE 1

To 200 parts of an aqueous solution containing $2.5 \times 10^{-3}$ mole/liter of aluminum nitrate [$Al(NO_3)_3$], was added 100 parts of $\alpha$-alumina ($\alpha$-$Al_2O_3$; AKP-30 of Sumitomo Chemical Co.) of 0.4 $\mu$m in average (median) particle size. The mixture was uniformly dispersed by ultrasonic treatment for 30 minutes. To the dispersion, the temperature of which had been elevated to 50° C., was added 50 parts of an aqueous solution containing 1 part of sodium dodecanoate. The mixture was stirred at 50° C. for one hour. The dispersed phase was collected by filtration and dried to obtain an abrasive for use in magnetic recording media.

Into a test tube was charged 0.2 g of the above prepared $\alpha$-$Al_2O_3$ powder together with 10 ml of a solvent mixture (1:1:1 by weight) of methyl ethyl keton (MEK), methyl isobutyl keton (MIBK), and toluene so as to become 10 cm of sample liquid height. The mixture was shaken for 5 minutes, then subjected to ultrasonic dispersing treatment, then left standing still for 24 hours, and the height of the sediment was determined by subtracting the height of clarified liquid layer from the initial liquid layer. The height was found to be 9 cm (the greater the height, the better is the dispersion). The result showed that the above prepared $\alpha$-$Al_2O_3$ possessed surface oleophilic characteristics and excellent dispersibility in an organic solvent.

The abrasive for use in magnetic recording media obtained above was incorporated in a magnetic coating composition and a magnetic tape was prepared in the following manner.

Five parts of the above prepared $\alpha$-$Al_2O_3$ was uniformly mixed with the magnetic coating composition given below. After addition of 2 parts of a polyisocyanate, the coating composition was coated on a strip of polyester film and subjected to surface glossing treatment and heat treatment to prepare a magnetic tape specimen No. 1. The specimen was tested for the degree of dispersion of $\alpha$-$Al_2O_3$ in the magnetic coating layer, the still characteristics, and the abrasion of the magnetic head.

|  | Parts |
|---|---|
| Co-containing $\gamma$-$Fe_2O_3$, needle | 100 |
| Lecithin | 1 |
| Polyurethane | 7 |
| Nitrocellulose | 8 |
| Vinyl chloride-vinyl acetate copolymer | 8 |
| Carbon black | 5 |
| Silicone oil | 1 |
| MEK | 70 |
| MIBK | 70 |
| Toluene | 70 |

EXAMPLE 2

Using $\alpha$-$Al_2O_3$ (AKP-20 of Sumitomo Chemical Co.) of 0.5 $\mu$m in average particle size, magnetic tape specimen No. 2 was prepared in the same manner as described in Example 1. After the oleophilization treatment on the surface, the $\alpha$-$Al_2O_3$ showed the sediment height of 8.8 cm in the solvent mixture of MEK, MIBK, and toluene after 24 hours.

EXAMPLE 3

Using sodium di-2-ethylhexyl sulfosuccinate as a dispersing agent, magnetic tape specimen No. 3 was prepared in the same manner as described in Example 1. After oleophilization treatment, the $\alpha$-$Al_2O_3$ showed the sediment height of 8.9 cm in the solvent mixture of MEK, MIBK, and toluene after 24 hours.

EXAMPLE 4

Using sodium dodecylbenzenesulfonate as dispersing agent, magnetic tape specimen No. 4 was prepared in the same manner as described in Example 1. After oleophilization treatment, the α-Al$_2$O$_3$ showed the sediment height of 9.1 cm in the solvent mixture of MEK, MIBK, and toluene after 24 hours.

specimen was placed in a video tape recorder to determine the still characteristics. The abrasion of a magnetic head was determined by repeated running test for 100 hours to reproduce the recorded signals. The results obtained were as shown in Table 1.

TABLE 1

| Specimen No. | Still characteristics* (minute) | Abrasion of head (μm/100 hour) | Average roughness along center line (μm) | Presence of agglomerated particle |
| --- | --- | --- | --- | --- |
| 1 | >300 | 3 | 0.02 | Practically no |
| 2 | " | 4 | " | " |
| 3 | " | 3 | " | " |
| 4 | " | 3 | " | " |
| 5 | " | 2 | " | " |
| A (Comp. Ex. 1) | 200 | 3 | 0.08 | yes |
| B (Comp. Ex. 2) | 160 | 2 | 0.08 | yes |

Note:
*Each magnetic tape was run on a video tape recorder to reproduce a still picture and the time (still life) elapsed before the output signal had declined by 10 dB from the input level was determined.

EXAMPLE 5

To 200 parts of an IPA solution containing 1 part of oleic acid, was added 100 parts of TiO$_2$ (rutile type) of 0.5 μm in average particle size. The mixture was subjected to ultrasonic treatment for 30 minutes to form a uniform dispersion. After addition of 200 parts of water, the dispersion was stirred for one hour, then removed of the dispersing medium by filtration, and dried to obtain an abrasive for use in magnetic recording media. The thus treated TiO$_2$ showed the sediment height of 8.5 cm in the solvent mixture of MEK, MIBK, and toluene after 24 hours. In the same manner as described in Example 1, the TiO$_2$ thus treated was incorporated in the magnetic coating composition. Using the resulting coating composition, magnetic tape specimen No. 5 was prepared in the same manner as described in Example 1.

COMPARATIVE EXAMPLE 1

α-Al$_2$O$_3$ of 0.5 μm in average particle size without having been treated with a dispersing agent having an oleophilic group was incorporated in the magnetic coating composition. Using the composition, magnetic tape specimen A was prepared in the same manner as described in Example 1. The α-Al$_2$O$_3$ without having been subjected to oleophilization treatment showed the sediment height of 0.5 cm in the solvent mixture of MEK, MIBK, and toluene after standing for 24 hours.

COMPARATIVE EXAMPLE 2

TiO$_2$ (rutile type) of 0.5 μm in average particle size without having been treated with a dispersing agent having an oleophilic group was incorporated in the magnetic coating composition. Using the composition, magnetic tape specimen B was prepared in the same manner as described in Example 1. The TiO$_2$ (rutile type) without having been subjected to the oleophilization treatment showed the sediment height of 1.0 cm in the solvent mixture of MEK, MIBK, and toluene after standing for 24 hours.

The magnetic tape specimens No. 1 to No. 5 and Nos. A and B prepared in Examples 1 to 5 and Comparative Examples 1 and 2, respectively, were observed under a scanning electron microscope to confirm the state of dispersion of each inorganic powder material. The specimens were tested also for the surface roughness by means of a surface roughness meter to determine the average roughness along the center line. Further, each It is clear from the above results that when incorporated in a magnetic coating composition, the inorganic powder material having an oleophilic surface prepared according to this invention serves as an abrasive to improve both the surface evenness and especially the wear resistance of magnetic recording media, thus contributing much to the improvement in the characteristics of magnetic recording tape. In above Examples magnetic video recording tapes comprising Co-containing needle γ-Fe$_2$O$_3$ as the magnetic powder material were described, but the invention is not limited thereto. The abrasives according to this invention are effective also in a magnetic tape containing a magnetic metal powder such as magnetic iron powder and in all of the magnetic tapes, discs, and cards containing various magnetic powder materials.

What is claimed is:

1. In a magnetic recording medium comprising a support and a magnetic recording layer coated thereon, the improvement wherein the magnetic recording layer comprises 0.1 to 15 parts per 100 parts of a magnetic powder material (weight by weight) of an abrasive having an oleophilic surface obtained by subjecting a non-magnetic inorganic powder material having a Mohs hardness of 5 or above and an average particle size of 0.1 to 2 μm and selected from the group consisting of γ-alumina, α-alumina, chromium oxide and titanium oxide to a wet contact treatment with an aqueous solution or an organic solvent solution of a dispersing agent having an oleophilic group and drying the treated powder material.

2. A magnetic recording medium according to claim 1, wherein the non-magnetic inorganic powder material is a member selected from the group consisting of α-Al$_2$O$_3$ and TiO$_2$.

3. In a process for producing a magnetic recording medium comprising a support and a magnetic recording layer coated thereon, said magnetic recording layer comprising magnetic powder material, wherein abrasive particles are incorporated into said medium, the improvement comprising prior to incorporation of the abrasive particles into the medium, subjecting said particles in the form of a non-magnetic inorganic powder material having a Mohs hardness of 5 or above and an average particle size of 0.1 to 2 μm and selected from the group consisting of γ-alumina, α-alumina, chromium oxide and titanium oxide to contact with an aqueous solution or an organic solvent solution containing 0.01 to 20 parts by weight per 100 parts of said inorganic powder material of a dispersing agent containing an oleophilic group followed by drying to thereby render the surface of the abrasive particles oleophilic and improve the dispersability thereof in the magnetic recording medium.

4. A process according to claim 3, wherein the dispersing agent having an oleophilic group is used in an amount of 0.02 to 10 parts by weight per 100 parts by weight of the inorganic powder material.

5. A process according to claim 3, wherein the dispersing agent having an oleophilic group is at least one member selected from the group consisting of higher fatty acids having 10 to 18 carbon atoms; ammonium, sodium, potassium, magnesium, calcium and aluminum salts of said higher fatty acids; ammonium, sodium, potassium, magnesium, clacium and aluminum salts of sulfuric acid esters of higher alcohols having 10 to 18 carbon atoms; ammonium, sodium, potassium, magnesium, calcium and aluminum salts of alkylarylsulfonic acid esters, said alkyl group having 10 to 18 carbon atoms and said aryl group having 6 or 10 carbon atoms; ammonium, sodium, potassium, magnesium, calcium, and aluminum salts of dialkylsulfosuccinic acids, said alkyl group having 4 to 12 carbon atoms; ammonium, sodium, potassium, magnesium, calcium, and aluminum salts of polyoxyethylene alkyl ether sulfates, said alkyl group having 10 to 18 carbon atoms and said polyoxyethylene group having 7 to 13 ethylene oxide units; polyoxyethylene higher alcohol ethers, said polyoxyethylene having 7 to 13 ethylene oxide units and said higher alcohol having 10 to 18 carbon atoms; polyoxyethylene alkylphenol ethers, said polyoxyethylene having 7 to 13 ethylene oxide units and said alkyl group having 8 to 18 carbon atoms; sorbitan higher fatty acid esters, said higher fatty acid having 10 to 18 carbon atoms; polyoxyethylene-sorbitan higher fatty acid esters, said polyoxyethylene having 7 to 13 ethylene oxide units and said higher fatty acid having 10 to 18 carbon atoms; polyoxyethylene higher fatty acid esters, said polyoxyethylene having 7 to 13 ethylene oxide units and said higher fatty acid having 10 to 18 carbon atoms; glycerol higher fatty acid esters, said higher fatty acid having 10 to 18 carbon atoms; higher alkylamine acetic acid salts, said alkyl group having 10 to 18 carbon atoms; quaternary ammonium salts having alkyl groups of 1 to 18 carbon atoms; polyoxyethylene alkylamines, said polyoxyethylene having 7 to 13 ethylene oxide units and said alkyl group having 10 to 18 carbon atoms; phosphoric acid esters of higher fatty acids having 10 to 18 carbon atoms; organic silane compounds; and organotitanium compounds.

6. A process according to claim 3, wherein the nonmagnetic inorganic powder material is a member selected from the group consisting of $\alpha$-$Al_2O_3$ and $TiO_2$.

* * * * *